United States Patent

Weik et al.

[11] 4,084,435
[45] Apr. 18, 1978

[54] SYSTEM FOR MEASURING WATER LEVEL IN GASOLINE TANK

[75] Inventors: Edward Weik, Williston Park; Roger Thomson, Bayshore, both of N.Y.

[73] Assignee: Petrometer Corporation, New Hyde Park, N.Y.

[21] Appl. No.: 783,680

[22] Filed: Apr. 1, 1977

[51] Int. Cl.$^2$ .......................................... G01F 23/14
[52] U.S. Cl. .................................................. 73/299
[58] Field of Search .................................. 73/302, 299

[56] References Cited

U.S. PATENT DOCUMENTS

| 2,121,743 | 6/1938 | Oyen | 73/299 |
| 2,613,535 | 10/1952 | Born | 73/302 |
| 2,625,042 | 1/1953 | Binford | 73/299 |
| 2,628,500 | 2/1953 | Johnson | 73/299 |
| 3,161,052 | 12/1964 | Harley | 73/302 |

FOREIGN PATENT DOCUMENTS

| 571,121 | 11/1924 | France | 73/299 |
| 548,520 | 9/1956 | Italy | 73/299 |
| 638,057 | 5/1950 | United Kingdom | 73/299 |

Primary Examiner—Richard C. Queisser
Assistant Examiner—Joseph W. Roskos
Attorney, Agent, or Firm—Henry R. Lerner

[57] ABSTRACT

A system for measuring the water level, within a predetermined range, at the bottom of a tank containing gasoline. A first air bell is adapted to be inserted into said tank and has an opening in the lower part thereof to define a first interface. A second air bell is disposed interiorly of the first air bell and has an opening in the lower part thereof to define a second interface which is lower than the first interface. The upper ends of the air bells are in communication, respectively, with opposite legs of a manometer so as to produce a displacement of manometer liquid as a function of the difference of hydrostatic pressure between said interfaces whereby said displacement is a function of the water level therebetween, there being minimum displacement when the water level is at said second interface and maximum displacement when the water level is at said first interface.

9 Claims, 2 Drawing Figures

SYSTEM FOR MEASURING WATER LEVEL IN GASOLINE TANK

BACKGROUND OF THE INVENTION

The present invention addresses itself to the problem of measuring the contents of gasoline in an underground gasoline tank as well as obtaining an indication of the extent to which water has accumulated into said gasoline tank.

In gasoline stations, regardless of the precautions which may be taken, a certain amount of water will inevitably accumulate in the gasoline tanks and the accumulation of an excessive amount of water in the tanks is clearly undesirable. Accordingly, it becomes important for the gasoline station attendant to prevent excessive accumulation of water in the gasoline tanks and towards such end, it is necessary to ascertain periodically the amount of water in the tank and to remove such water when it exceeds a predetermined minimum quantity.

In accordance with the prior art, the most conventional way of ascertaining the quantity of water in a gasoline tank is to use a dip stick suitably taped and insert the same inside the tank until it hits bottom, causing a marking on the tape corresponding to the water level at the bottom of the tank. This method is rather cumbersome, unprecise and has the further disadvantage that it requires the gasoline tank to be opened for the measurement, creating hazardous conditions.

Another method of accomplishing the same result in accordance with the prior art is by use of sophisticated electronic scanning systems. Such systems, however, are highly complex, fragile and expensive and thus outside the reasonable reach of most gasoline station operators.

SUMMARY OF THE INVENTION

In accordance with the invention, there is provided apparatus which gives an indication that the water content at the bottom of the tank has reached or surpassed a predetermined amount and which is integrated with the apparatus for measuring the overall gasoline fluid content in the tank.

Towards such end, there is provided in the gasoline tank a pair of concentric air bells with the inner air bell having a lower interface than the outer air bell. The upper end of the outer air bell is in communication with one leg of a manometer, the other leg of which is either vented, if the gasoline tank is vented, or in communication with the gasoline tank to equalize the pressure, if the tank is not vented. Accordingly, such manometer provides a reading of the pressure at the outer bell interface which is in direct proportion to the overall contents of the tank. The upper end of the inner air bell (having an interface lower than that of the outer bell) is in communication with the lower end of an inclined manometer, whose upper end is in communication with the upper end of the outer air bell. Accordingly, the inclined manometer provides an indication of the pressure differential between the interfaces of the outer and inner bells, respectively, such pressure differential having a minimum value when the water level is at or below the interface of the inner bell and having a maximum valve when the water level reaches or exceeds the upper interface of the outer air bell. In this connection, it must be noted that water having a higher density than gasoline, the accumulated water in the tank settles at the bottom thereof. The inclined manometer will thus provide an indication of whether the water at the bottom of the tank has reached or surpassed a predetermined level set by the higher interface of the outer air bell, such reading alerting the operator that the water content in the tank has reached an undesirable level, requiring the attendant to discharge the excess water from the bottom of the tank in conventional manner.

Thus, by placing an additional air bell inwardly of the tank contents measuring air bell, having a lower interface than that of the latter, and by measuring the pressure difference between the two interfaces, there has been provided, most ingeniously, a means in a conventional tank content measuring system to ascertain whether or not the water content in the tank has reached or exceeded a predetermined level.

DESCRIPTION OF THE PREFERRED EMBODIMENT

Figure 1:
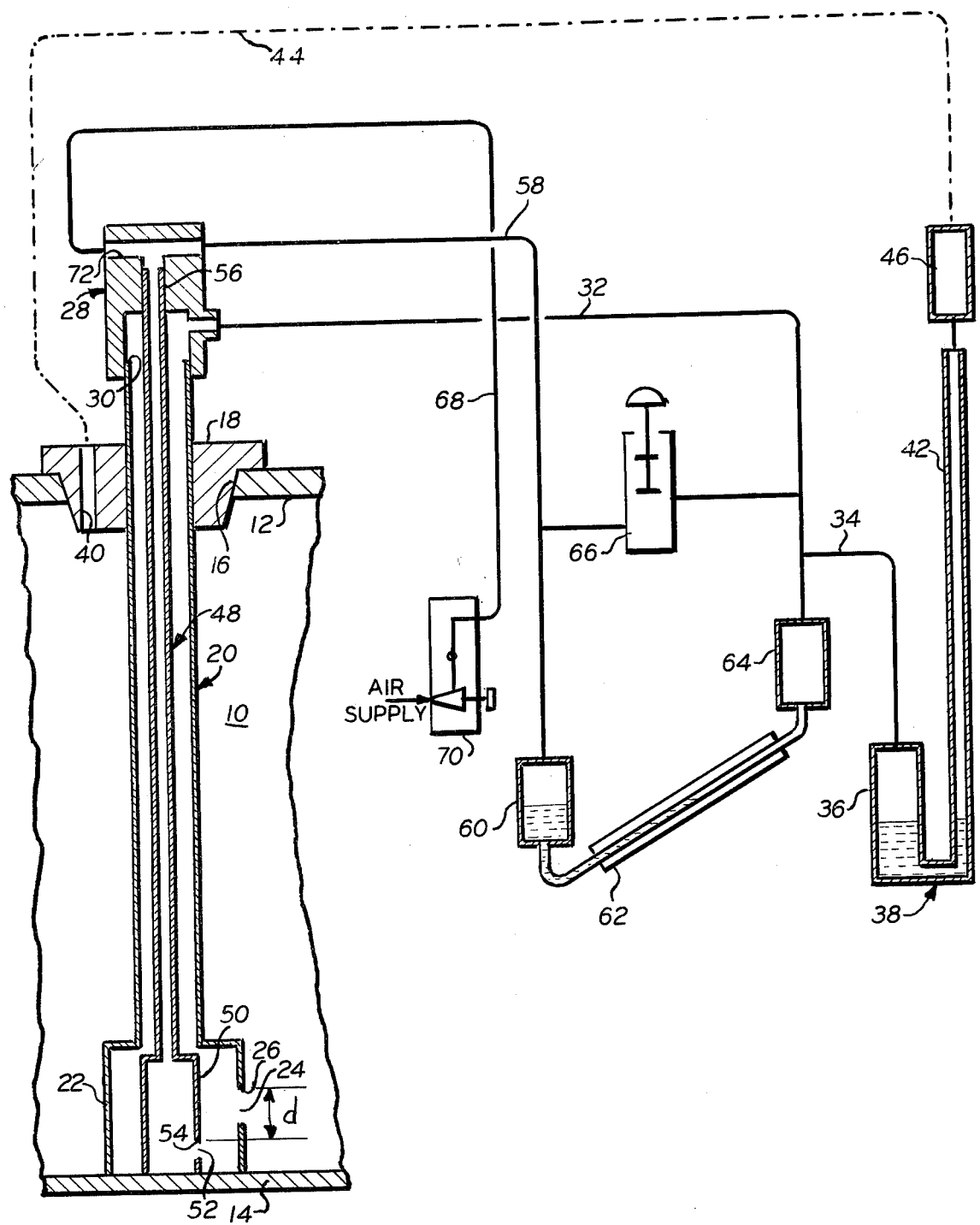
FIG. 1 is a schematic representation of the measuring system in accordance with the invention.

Referring now to the drawings, FIG. 1 shows a schematic representation of the apparatus defining the novel measuring system in accordance with the invention. In this schematic representation, there is shown a conventional gasoline tank 10 having top wall 12, bottom wall 14 and conventional peripheral walls not illustrated. Upper wall 12 is provided with an aperture 16 which receives a plug 18. An outer air bell 20 extends into tank 10 through plug 18, such air bell being tubular in construction and terminating at the bottom thereof in an enlarged diameter portion 22 whose open ended bottom is adapted to rest firmly against bottom wall 14 of the tank. Enlarged diameter portion 22 is provided with an opening 24 whose upper edge 26 defines the interface for air bell 20. A coupling 28 receives the upper open end 30 of air bell 20 and the hydrostatic pressure at interface 26 is transmitted through transmission lines 32 and 34 to the rear leg 36 of manometer 38. Where gasoline tank 10 is vented as at 40 to the atmosphere, front leg 42 of manometer 38 is similarly vented to the atmosphere whereby the hydrostatic pressure at interface 26 causes displacement of the liquid in manometer 38, the extent of which displacement can be quantified by suitable calibrations on the indicator front leg 42 of manometer 38. In this connection, it will be understood that the pressure at interface 26 (where the air in air bell 20 meets the liquid in tank 10) is a direct function of the quantity of liquid content in tank 10 whereby, with appropriate calibrations on leg 42 of manometer 38, a direct reading of the contents of gasoline tank 10 is obtainable. As the level of gasoline in tank 10 goes down, the pressure or head at interface 26 decreases, causing a reduced displacement of the liquid in manometer 38 and in turn reducing the level of the liquid in leg 42 providing a correspondingly lower reading of tank content.

Where tank 10 is not vented to the atmosphere, an equalizing line 44 is provided between the upper end of tank 10 and leg 42 of manometer 38 through a liquid vent check valve 46.

The aforedescribed arrangement defines relatively conventional means for obtaining an indication of the contents of a gasoline tank.

In accordance with the invention, there is integrated within said tank content measuring system novel means for obtaining an indication of the extent to which water has accumulated in gasoline tank 10 and particularly an indication that such water content has reached or exceeded a predetermined range. As shown in FIG. 1, there is provided, within outer air bell 20, an inner air bell 48, tubular in construction for the major part thereof and terminating at the bottom in an enlarged diameter portion 50 whose open ended bottom is also adapted to rest firmly against bottom wall 14 of the tank. Enlarged inner air bell diameter portion 50 is located within enlarged outer bell diameter portion 22, and is provided with an opening 52 whose upper edge 54 defines the interface for inner air bell 48. In this connection, it will be noted, that interface 54 is lower than interface 26, the difference in level therebetween being identified as $d$. The upper open end 56 of inner air bell 48 is received in coupling 28 and the hydrostatic pressure at interface 54 is transmitted through transmission line 58 to the lower leg 60 of inclined manometer 62. The upper leg 64 of inclined manometer 62 is connected to previously described transmission line 32 which transmits the hydrostatic pressure at interface 26 of outer air bell 20. Since interface 54 is lower than interface 26, the liquid in inclined manometer 62 will be displaced in proportion to the pressure difference between interfaces 54 and 26, namely, head $d$. The magnitude of head $d$ will be a function of the density of the liquid column between interfaces 26 and 54. In this connection, it will be understood that any water accumulating in tank 10 will settle at the bottom, since the specific gravity of water is greater than that of the gasoline. Accordingly, when the water level in tank 10 is at or below interface 54, it will not be included in head $d$ and the pressure difference between said interfaces will be due only to the gasoline column therebetween and will be at a minimum value. As the water level rises between interfaces 54 and 26, the column therebetween will include some water, causing a greater pressure difference readily indicated by appropriate calibrations on the inclined manometer. Such pressure difference between the interfaces will continue to increase until the water level reaches interface 26 at which time the pressure difference therebetween will be due solely to the column of water therebetween to create a maximum head $d$ and consequently a maximum reading on inclined manometer 62. As the level of water continues to rise above interface 26, it will not affect head $d$ nor the reading on inclined manometer 62. What is evident, however, is that a reading of the inclined manometer will indicate whether or not the water level has reached interface 26. It will of course be understood that interface 26 is located at a level at which it is believed desirable to remove the water at the bottom of the tank. Thus all that is required is for the gasoline station attendant to periodically take a reading of the inclined manometer and when said reading indicates the maximum value corresponding to the water level having reached or surpassed interface 26, he will know that removal of the water is necessary. In this connection, there is preferably provided a push button reading valve 66 connected between transmission lines 32 and 58, i.e., between legs 60 and 64 of manometer 62. This reading valve is normally open so that the pressure in the inclined manometer is equalized and a reading of the water level is not ascertainable. When push button reading valve 66 is closed, an appropriate reading of the water level at the bottom of the tank is obtained. The push button reading valve serves a dual purpose. First it requires an affirmative step on the part of the attendant to obtain the water level reading which has been found to encourage taking of periodic reading as compared to a reading being available at all times without affirmative action, and thus often overlooked. Second it protects the inclined manometer from pressure surges that can be generated by tank filling, air leaks, line breakage, etc.

In accordance with another aspect of the invention, there is provided a purge line 68 connected at one end to the available compressed air supply at the station, through an air flow indicator 70. The other end of purge line 68 is connected to inlet passageway 72 in coupling 28 so that air from the air supply can be introduced into the air bells to purge all liquid therefrom and thus maintain accuracy in the system. Any liquid which may have risen into the air bells due to lack of tightness in the system is thus purged by means of the compressed air, in the following manner:

The compressed air supply phases through air flow indicator 70 through purge line 68 into passageway 72 of coupling 28. During normal operation of the system, with reading valve 66 open, the compressed air will partially purge inner air bell 48 and also pass through coupling 28 into transmission line 58, through open valve 66, through transmission line 32, into the upper end of outer air bell 20 forcing any liquid in air bell 20 into the tank until it is completely purged. Excess air will bubble out the bottom of air bell 20. Both air bell 20 and 48 will be purged to the level of interface 26. When push button valve 66 is closed, then the air is blocked by the inclined manometer and is directed to fully purge the inner air bell 48. Excess air bubbles out into air bell 20 also purging said air bell. Excess air then bubbles out into tank from bottom of air bell 20.

Under normal circumstances, air flow through a line causes a rise in pressure due to line resistance resulting in an incorrect high reading on the inclined manometer and, because of its great sensitivity, such error is exaggerated and thus objectionable. This condition is avoided in accordance with the present arrangement because with the valve 66 closed, the air flow passes through line 68 while only the true static pressure is transmitted through lines 58 and 32.

Figure 2:
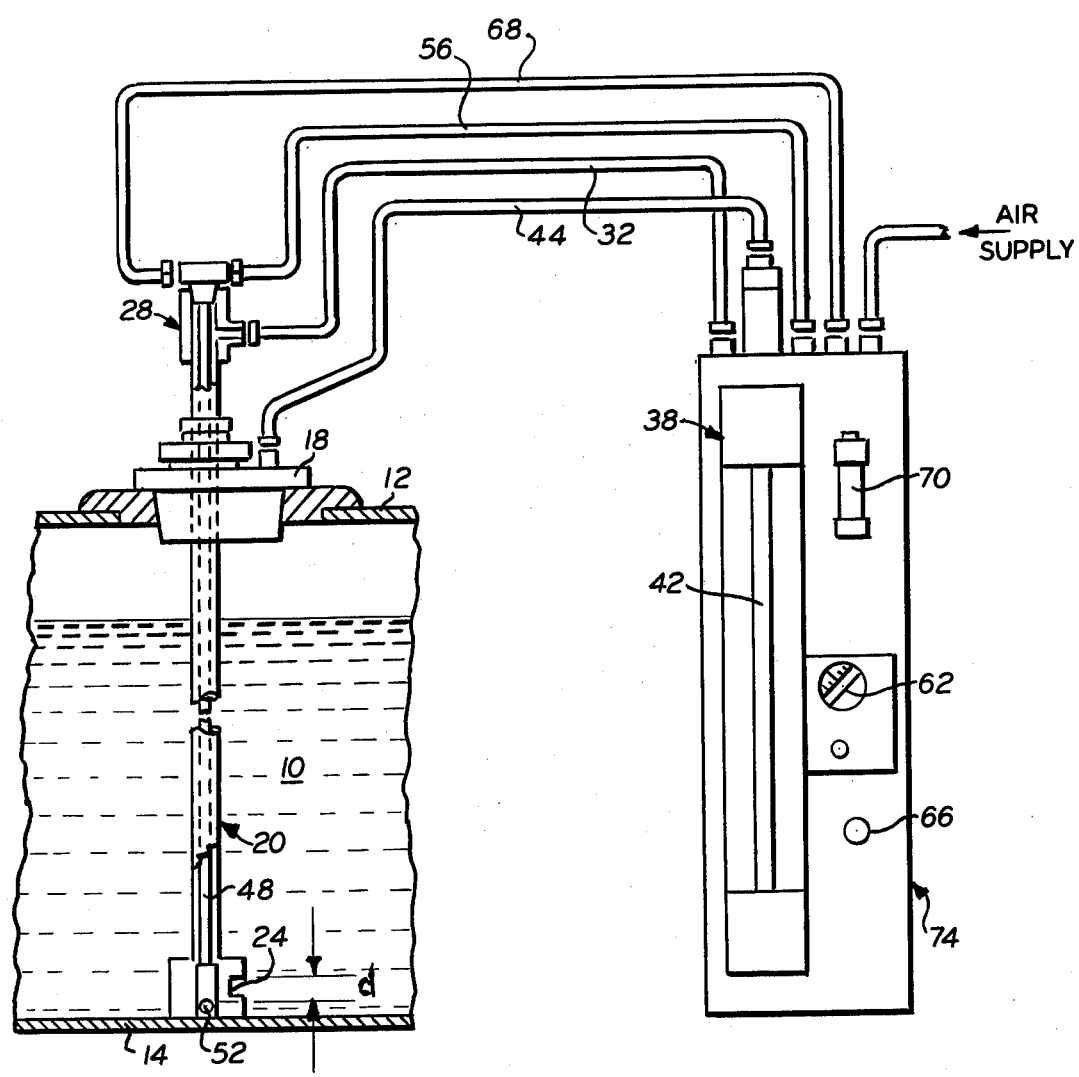
FIG. 2 is a schematic layout thereof.

FIG. 2 represents an actual schematic layout of the system in accordance with the invention as previously described in connection with FIG. 1 with the numerals in FIG. 2 being in all respects the same for the parts shown therein corresponding to those parts in FIG. 1. In FIG. 2, there is further shown instrument panel 74 in which are housed manometers 38 and 62, air flow indicator 70, and push button 66 whereby all the necessary readings are readily accessible to the gasoline station operator. In this connection, it will be noted that column 42 of manometer 38 is readily visible to provide the necessary reading for the overall contents of tank 10. Furthermore, push button 66 is located in the immediate vicinity of inclined manometer 62 so that the water indicating reading on manometer 62 is readily obtainable by pushing push button 66 in the manner aforedescribed. Finally, air flow indicator 70 is readily visible on panel 74 to determine the presence of the air flow for the aforedescribed purging purposes.

Thus, it is seen that the above described system is relatively simple in construction and fulfills all the objects of the invention, namely, the provision of readily available reading regarding the water level at the bottom of the tank, integrated within the tank content measuring system.

While there is herein shown and described the preferred embodiment of the invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

We claim:

1. A system for measuring the water level within a predetermined range at the bottom of a tank containing gasoline comprising,
   (a) a first air bell adapted to be inserted into said tank and having an opening in the lower part thereof to define a first interface,
   (b) a second air bell adapted to be inserted into said tank and having an opening in the lower part thereof to define a second interface which is lower than said first interface,
   (c) a manometer containing liquid between opposite legs thereof,
   (d) one leg of said manometer being in communication with the upper end of said second air bell for transmitting the hydrostatic pressure at said second interface to said one leg, and the other leg of said manometer being in communication with the upper end of said first air bell for transmitting the hydrostatic pressure at said first interface to said front leg, causing displacement of manometer liquid as a function of the pressure difference between said interfaces, whereby said displacement is a function of the water level between said interfaces, there being minimum displacement when said water level is at said second interface and maximum displacement when said water level is at said first interface,
   (e) the upper end of said first air bell being in communication with the rear leg of another manometer whose front leg is vented whereby the liquid displacement in said another manometer is a function of the gasoline level in said tank when the latter is vented.

2. A system in accordance with claim 1, wherein said second air bell is located within said first air bell.

3. A system in accordance with claim 2, wherein there is provided means for purging liquid from said first and second air bells.

4. A system for measuring the water level within a predetermined range at the bottom of a tank containing gasoline comprising,
   (a) a first air bell adapted to be inserted into said tank and having an opening in the lower part thereof to define a first interface,
   (b) a second air bell adapted to be inserted into said tank and having an opening in the lower part thereof to define a second interface which is lower than said first interface,
   (c) a manometer containing liquid between opposite legs thereof,
   (d) one leg of said manometer being in communication with the upper end of said second air bell for transmitting the hydrostatic pressure at said second interface to said one leg, and the other leg of said manometer being in communication with the upper end of said first air bell for transmitting the hydrostatic pressure at said first interface to said front leg, causing displacement of manometer liquid as a function of the pressure difference between said interfaces, whereby said displacement is a function of the water level between said interfaces, there being minimum displacement when said water level is at said second interface and maximum displacement when said water level is at said first interface,
   (e) the upper end of said first air bell being in communication with the rear leg of another manometer whose front leg is in communication with the upper end of the tank through an equalizing line whereby the liquid displacement in said another manometer is a function of the gasoline level in said tank when the latter is not 100% vented.

5. A system in accordance with claim 4, wherein said second air bell is located within said first air bell.

6. A system in accordance with claim 5, wherein there is provided a normally open valve between the opposite legs of said first mentioned manometer.

7. A system in accordance with claim 5, wherein there is provided means for purging liquid from said first and second air bells.

8. A system for measuring the level of a first liquid medium, within a predetermined range, at the bottom of a tank containing a second liquid medium of lower specific gravity than said first liquid medium comprising,
   (a) a first air bell adapted to be inserted into said tank and having an opening in the lower part thereof to define a first interface,
   (b) a second air bell adapted to be inserted into said tank and having an opening in the lower part thereof to define a second interface which is lower than said first interface,
   (c) a manometer containing liquid between opposite legs thereof,
   (d) one leg of said manometer being in communication with the upper end of said second air bell for transmitting the hydrostatic pressure at said second interface to said one leg, and the other leg of said manometer being in communication with the upper end of said first air bell for transmitting the hydrostatic pressure at said first interface to said front leg, causing displacement of manometer liquid as a function of the pressure difference between said interfaces, whereby said displacement is a function of the level of said first liquid medium between said interfaces, there being minimum displacement when said first liquid medium level is at said second interface and maximum displacement when said first liquid medium level is at said first interface,
   (e) the upper end of said first air bell being in communication with the rear leg of another manometer whose front leg is vented whereby the liquid displacement in said another manometer is a function of the level of the second liquid medium in said tank when the latter is vented.

9. A system for measuring the level of a first liquid medium, within a predetermined range, at the bottom of a tank containing a second liquid medium of lower specific gravity than said first liquid medium comprising,
   (a) a first air bell adapted to be inserted into said tank and having an opening in the lower part thereof to define a first interface, (b) a second air bell adapted to be inserted into said tank and having an opening in the lower part thereof to define a second interface which is lower than said first interface,
(c) a manometer containing liquid between opposite legs thereof,
(d) one leg of said manometer being in communication with the upper end of said second air bell for transmitting the hydrostatic pressure at said second interface to said one leg, and the other leg of said manometer being in communication with the upper end of said first air bell for transmitting the hydrostatic pressure at said first interface to said front leg, causing displacement of manometer liquid as a function of the pressure difference between said interfaces, whereby said displacement is a function of the level of said first liquid medium between said interfaces, there being minimum displacement when said first liquid medium level is at said second interface and maximum displacement when said first liquid medium level is at said first interface,
(e) the upper end of said first air bell being in communication with the rear leg of another manometer whose front leg is in communication with the upper end of the tank through an equalizing line whereby the liquid displacement in said another manometer is a function of the level of the second liquid medium in said tank when the latter is not 100% vented.

* * * * *